United States Patent
Park et al.

(10) Patent No.: US 9,569,603 B2
(45) Date of Patent: Feb. 14, 2017

(54) METHOD AND APPARATUS FOR OPERATING MOBILE TERMINAL

(71) Applicant: Samsung Electronics Co., Ltd., Gyeonggi-do (KR)

(72) Inventors: Young Joo Park, Gyeonggi-do (KR); Se Hwan Park, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/655,050

(22) Filed: Oct. 18, 2012

(65) Prior Publication Data

US 2013/0097668 A1 Apr. 18, 2013

(30) Foreign Application Priority Data

Oct. 18, 2011 (KR) .................. 10-2011-0106502

(51) Int. Cl.
*G06F 21/36* (2013.01)
*G06F 21/31* (2013.01)
*H04M 1/725* (2006.01)
*H04M 1/665* (2006.01)

(52) U.S. Cl.
CPC .......... *G06F 21/31* (2013.01); *H04M 1/72519* (2013.01); *H04M 1/72563* (2013.01); *G06F 2221/2149* (2013.01); *H04M 1/665* (2013.01); *H04M 2250/22* (2013.01)

(58) Field of Classification Search
CPC .............................. G06F 21/121; G06F 21/36
USPC .......................................................... 726/2
See application file for complete search history.

(56) References Cited

U.S. PATENT DOCUMENTS

| 6,459,912 | B1 | 10/2002 | Moeller et al. |
| 6,996,407 | B2 | 2/2006 | Taniguchi |
| 2005/0250530 | A1 | 11/2005 | Tanaka |
| 2006/0211412 | A1 | 9/2006 | Vance |
| 2008/0020803 | A1 | 1/2008 | Rios et al. |
| 2008/0318616 | A1 | 12/2008 | Chipalkatti et al. |

(Continued)

FOREIGN PATENT DOCUMENTS

| CN | 1610875 A | 4/2005 |
| CN | 101147409 A | 3/2008 |

(Continued)

OTHER PUBLICATIONS

Communication dated Apr. 3, 2015 issued by the State Intellectual Property Office of the People's Republic of China in counterpart Chinese Patent Application No. 201280062742.6.

(Continued)

*Primary Examiner* — Izunna Okeke
*Assistant Examiner* — Hee Song
(74) *Attorney, Agent, or Firm* — Sughrue Mion, PLLC

(57) ABSTRACT

A method and apparatus for easily restricting a use right and improving use convenience in a mobile terminal are provided. The method includes displaying a profile list for selecting a set operation mode of the mobile terminal from the displayed profile list; setting an operation mode of the mobile terminal as the selected operation mode, when the set operation mode is selected from the displayed profile list,; and displaying a screen associated with the selected operation mode, wherein the set operation mode includes an open mode to use all functions of the mobile terminal and a limited mode to use only set functions.

18 Claims, 5 Drawing Sheets

(56) References Cited

U.S. PATENT DOCUMENTS

| | | |
|---|---|---|
| 2009/0284482 A1 | 11/2009 | Chin |
| 2010/0235881 A1 | 9/2010 | Liu et al. |
| 2011/0004826 A1 | 1/2011 | Cho et al. |
| 2011/0251954 A1* | 10/2011 | Chin .................. G06F 3/04883 705/40 |
| 2012/0023573 A1* | 1/2012 | Shi ..................... G06F 3/04883 726/17 |
| 2012/0084734 A1* | 4/2012 | Wilairat ........................ 715/863 |
| 2012/0220264 A1* | 8/2012 | Kawabata ..................... 455/411 |

FOREIGN PATENT DOCUMENTS

| | | |
|---|---|---|
| CN | 101923614 A | 12/2010 |
| CN | 101945162 A | 1/2011 |
| KR | 1020040051132 | 6/2004 |
| KR | 1020050037613 | 4/2005 |
| KR | 1020060085068 | 7/2006 |

OTHER PUBLICATIONS

Communication dated Apr. 9, 2015 issued by the European Patent Office in counterpart European Patent Application No. 12842491.8.
Communication dated Feb. 3, 2016 issued by The State Intellectual Property Office of P.R. China in counterpart Chinese Patent Application No. 201280062742.6.

\* cited by examiner

METHOD AND APPARATUS FOR OPERATING MOBILE TERMINAL

PRIORITY

This application claims priority under 35 U.S.C. §119(a) to Korean Patent Application No. 10-2011-0106502 filed in the Korean Intellectual Property Office on Oct. 18, 2011, the entire disclosure of which is incorporated herein by reference.

BACKGROUND OF THE INVENTION

1. Field of the Invention

The present invention relates generally to a method and apparatus for operating a mobile terminal, and more particularly, to a method and apparatus capable of operating a mobile terminal in various operation modes.

2. Description of the Related Art

Modern mobile terminals include, for example, smartphones controlled by on a touch, and performs multi-tasking. The mobile terminal provides various functions such as games, the Internet and call and include various content such as e-mails, moving images, pictures and contact addresses to a user. However, a use right functionality may be required for content due to reasons of billing and security.

If a screen is turned on, a mobile terminal displays a locked screen. When a predetermined password is input by the user, the mobile terminal releases the locked state to allow the user to use functions and content stored on the mobile terminal. Further, a use right of the mobile terminal may be restricted by setting a password to certain functions or content. However, to use functions or content in which the use right is restricted, the user inputs a password each time. This is very inconvenient for the user. In general, because a mobile terminal such as a smartphone or tablet PC is a private terminal, only a single user would use it. That is, the mobile terminal may be configured to be used by a single user. Accordingly, when a password is set, because the user is inconvenienced, the user does not generally use the use right function to restrict the mobile terminal.

SUMMARY OF THE INVENTION

The present invention has been made in view of the above problems, and provides a method and an apparatus for easily restricting a use right and improving use convenience in a mobile terminal. To accomplish this, the present invention provides a method and an apparatus for operating a mobile terminal such that an operation mode of the mobile terminal may be easily changed.

In accordance with an aspect of the present invention, a method for operating a mobile terminal is provided. The method includes displaying a profile list for selecting a set operation mode of the mobile terminal from the displayed profile list; setting an operation mode of the mobile terminal as the selected operation mode, when the set operation mode is selected from the displayed profile list; and displaying a screen associated with the selected operation mode, wherein the set operation mode includes an open mode to use all functions of the mobile terminal and a limited mode to use only set functions.

In accordance with another aspect of the present invention, an apparatus for operating a mobile terminal is provided. The apparatus includes a display unit for displaying a set operation mode of the mobile terminal from the displayed profile list; at least one of a key input unit and a touchscreen for selecting a set operation mode from the displayed profile list; and a controller setting an operation mode of the mobile terminal as a selected operation mode when the set operation mode is selected from the displayed profile list, and controlling such that a screen associated with the selected operation mode is displayed, wherein the set operation mode includes an open mode to use all functions of the mobile terminal and a limited mode to use only set functions.

BRIEF DESCRIPTION OF THE DRAWINGS

The aspects, objects, features and advantages of the present invention will be more apparent from the following detailed description in conjunction with the accompanying drawings, in which.

DETAILED DESCRIPTION OF EMBODIMENTS OF THE PRESENT INVENTION

Embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

A mobile terminal according to the present invention includes various information and communication devices, multi-media devices, and application devices such as digital broadcasting player, Personal Digital Assistant (PDA), a smartphone, tablet PC, and hand-held PC as well as various mobile communication terminals operating based on communication protocols corresponding to various communication systems. Hereinafter, it is assumed that the mobile terminal is a smartphone.

The mobile terminal according to the present invention provides various operation modes to a user and may be operated in an operation mode selected by the user. Further, the mobile terminal provides an operation mode-setting menu such that the user optionally sets an operation mode. That is, the operation mode includes an open mode allowing a user to use all functions of the mobile terminal and at least one limited mode allowing the user to use only certain functions (e.g., call, Internet access, message transmission, and the like). In particular, if a mobile terminal of the present invention is in a limited mode, it displays only a screen associated with the limited mode. For example, when only the calling feature can be used in the mobile terminal, the terminal displays only a call screen for calling a counterpart. The characteristics of the present invention will be described in detail below. However, in the following description of the present invention, a detailed description of known functions and configurations incorporated herein will be omitted when it may make the subject matter of the present invention rather unclear.

Figure 1:
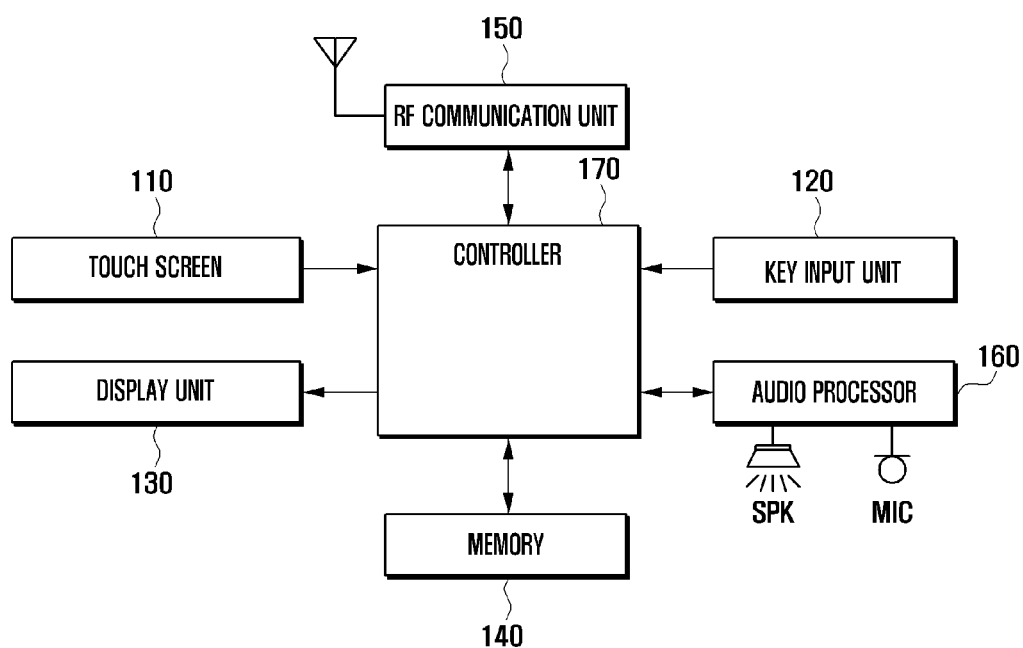
FIG. 1 is a block diagram illustrating a configuration of a mobile terminal, according to an embodiment of the present invention.

FIG. 1 is a block diagram illustrating a configuration of a mobile terminal according to an embodiment of the present invention. Referring to FIG. 1, a mobile terminal of the present invention includes a touchscreen 110, a key input unit 120, a display unit 130, a memory 140, a Radio Frequency (RF) communication unit 150, an audio processor 160, a SPeaKer (SPK), a MICrophone (MIC), and a controller 170.

The touchscreen 110 is installed in the front of display unit 130, and generates and transfers a touch event to the controller 170 according to an operation of a user. The controller 170 can set a user right of a mobile terminal in response to the touch event and controls the foregoing structural elements. The user operation is classified into touch, tap, double tap, press, drag, drag & drop, sweep, and the like. The touch is an operation where a user pushes one point of a screen. The tap is an operation where a user's finger is touches the screen and removed his finger without moving the finger after touching one point. The double tap is an operation where a user taps the screen twice. The press is an operation where a finger is removed from a corresponding point without moving the finger after touching it longer than the tap. The drag is an operation where the user moves his finger in a direction after one point is touched. The drag & drop is an operation that removed a finger after a drag. The sweep is an operation that removes a finger after moving it by flipping (i.e., the sweep is a touch gesture in which the user makes a skimming motion with a finger as if flipping a page of a book) at high speed. The drag may also be called a scroll and the sweep may be called a flick. The controller 170 distinguishes the sweep and the drag from one another by the speed of movement. Further, touchscreen 110 may be a resistive type, a capacitive type, and a pressure type.

The key input unit 120 includes a plurality of input keys and function keys for receiving input of numerals or character information, and setting various functions. The function keys includes arrow keys, side keys, and hot keys set to perform a certain function. Further, the key input unit 120 generates and transfers key signals associated with setting a use right and function control of the mobile terminal to the controller 170. The key signals includes a power on/off signal, a volume control signal, and a screen on/off signal. The controller 170 controls the foregoing structural elements according to the key signals. The key input unit 120 may be implemented by a Qwerty keypad, a 3*4 keypad, and a 4*3 keypad having a plurality of keys. Further, when a touchscreen 110 of the mobile terminal is supported in the form of a full touchscreen, the key input unit 120 includes at least one side key for screen on/off and on/off of the mobile terminal, which is provided at a side of a case of the mobile terminal.

The display unit 130 converts image data input from the controller 170 into an analog signal and displays the analog signal. That is, the display unit 130 provides various screens based on the utilization of the mobile terminal, for example, a locked screen, a home screen, an application execution screen, a menu screen, a message creation screen, a calling screen, an Internet screen, and a keypad screen. In particular, the display unit 130 provides a part of the foregoing screens under the control of the controller 170. The locked screen is an image displayed when a screen of the display unit 130 become large. If a certain touch event for lock release occurs, the controller 170 switches a displayed image from a locked screen to a home screen or an application execution screen. The home screen is an image with a plurality of application icons corresponding to a plurality of applications. If one is selected from a plurality of application icons by a user, the controller 170 executes a corresponding application and switch a displayed image to an execution screen of a corresponding application. Further, the display unit 130 divides a screen into a plurality of regions under the control of the controller 170 and displays the divided regions on different screens. For example, the display unit 130 divides a screen into a first region and a second region, displays an application execution screen on the first region, and displays a keypad screen on the second region.

The display unit 130 may be configured as a flat panel display such as Liquid Crystal Display (LCD), Organic Light Emitted Diode (OLED), or Active Matrix Organic Light Emitted Diode (AMOLED). Further, the display unit 130 includes a 3D implementing part for displaying a left eye image and a right eye image and controlling such that a user feels a depth feeling for displayed left/right eye images. The 3D implement type is divided into a glasses type and an auto-stereoscopic type. The glasses type includes a color filter type, a deflection filter type, and a shutter glass type, and the auto-stereoscopic type includes a lenticular lens type and a parallax barrier type.

Memory 140 stores various data as well as an Operating System (OS) of a mobile terminal and applications necessary for the present invention. The memory 140 includes a program area and a data area.

The data area of the memory 140 stores data created by the controller 160 based on the use of the mobile terminal. Further, the data area stores the foregoing screens displayed on the display unit 130. A keypad screen and a menu screen of the screens may be in various forms. That is, the keypad screen may be in the form of 3*4 or QWERTY. Further, the menu screen includes a screen switch key (e.g., a return key for returning a screen to a previous screen) for switching a screen and a control key for controlling a currently executed application. In particular, a menu screen according to the present invention includes a setting key for setting an operation mode. The setting is displayed to overlap a locked screen, an application execution, and a home screen as an icon form. Further, the data area temporarily stores data copied from messages, photographs, web pages, and documents by the user for inspiring. Moreover, the data area stores various setting values (e.g., screen brightness, presence of vibration and automatic screen rotation upon touch occurrence) for operating the mobile terminal. In particular, the memory 140 of the present invention stores a setting value associated with an operation mode. The setting value associated with the operation mode is in a format as illustrated in Table 1. In Table 1, a setting value of an open mode is a default value automatically set when the mobile terminal is booted. Operation modes and a profile list including setting values by operation modes as listed in Table 1 is directly created by the user. To do this, the mobile terminal provides a menu screen that allows the user to create the operation modes and setting values thereof

TABLE 1

| Operation modes | Setting value |
| --- | --- |
| Open mode | ALL |
| Call mode | Only call |
| Internet mode | Only Internet |
| "My Kids" mode | Only applications associated with children's song and games |

The program area stores the OS for booting the mobile terminal and operating the foregoing structural elements, and applications for supporting various functions, for example, a user function for supporting a call function, a web browser accessing to an Internet server, an MP3 user function for playing other sound sources, and photographs. In particular, the program area stores an application that provides various operation modes to the user and supports a function operation in an operation mode selected by the user. The application is set to be automatically executed when the mobile terminal is booted, and include a routine controlling a display unit 130 to display only a restrictive screen according to a limited mode and a routine capable of optionally setting an operation mode by the user.

The RF communication unit 150 forms a communication channel for voice call, a communication channel for videophone call, and a communication channel for data such as images or messages under the control of the controller 170. That is, the RF communication unit 150 forms a voice call channel, a data communication channel, and a videophone call channel between mobile communication systems. To accomplish this, the RF communication unit 150 includes an RF transmitter for up-converting a frequency of a signal for transmission and amplifying the signal, and an RF receiver for low-noise-amplifying a received signal and down-converting a frequency of the signal.

The audio processor 160 transmits an audio signal input from the controller 170 to a speaker SPK, and transfers an audio signal such as a voice input from a microphone MIC to the controller 170. That is, the audio processor 160 converts voice/sound data into an audible sound, and output the audio sound through the speaker SPK under the control of the controller 170. The audio processor 160 converts an audio signal such as a voice received from the microphone MIC into a digital signal, and transfer the digital signal to the controller 170.

The controller 170 performs a function that controls an overall operation and signal flow between internal structural elements of the mobile terminal, and processes data. The controller 170 controls the power supply from a battery to internal structural elements. In particular, a controller 170 according to the present invention controls such that an operation mode-setting menu is displayed. If an operation mode is selected from an operation mode-setting menu by the user, the controller 170 operates in the selected operation mode. Specifically, the controller 170 controls such that only a screen associated with the selected operation mode is displayed. Hereinafter, various embodiments associated with the function of the controller 170 will be described in detail with reference to the accompanying drawings.

Although not shown in FIG. 1, the foregoing mobile terminal further includes various additional modules according to provision forms. That is, when the mobile terminal is a communication terminal, it includes constructions that are not mentioned such as a near distance communication module for near distance communication, an interface exchanging data in a wired communication scheme or a wireless communication scheme of the mobile terminal 100, an Internet communication module communicating with an Internet to perform an Internet function, and a digital broadcasting module receiving and broadcasting digital broadcast. Since the structural elements can be changed in various ways, no elements can be listed. However, the portable terminal includes structural elements equivalent to the foregoing structural elements. Further, the terminal of the present invention may be substituted by specific constructions in the foregoing arrangements according to the provided form or another structure. This can be understood to those skilled in the present art.

Figure 2:
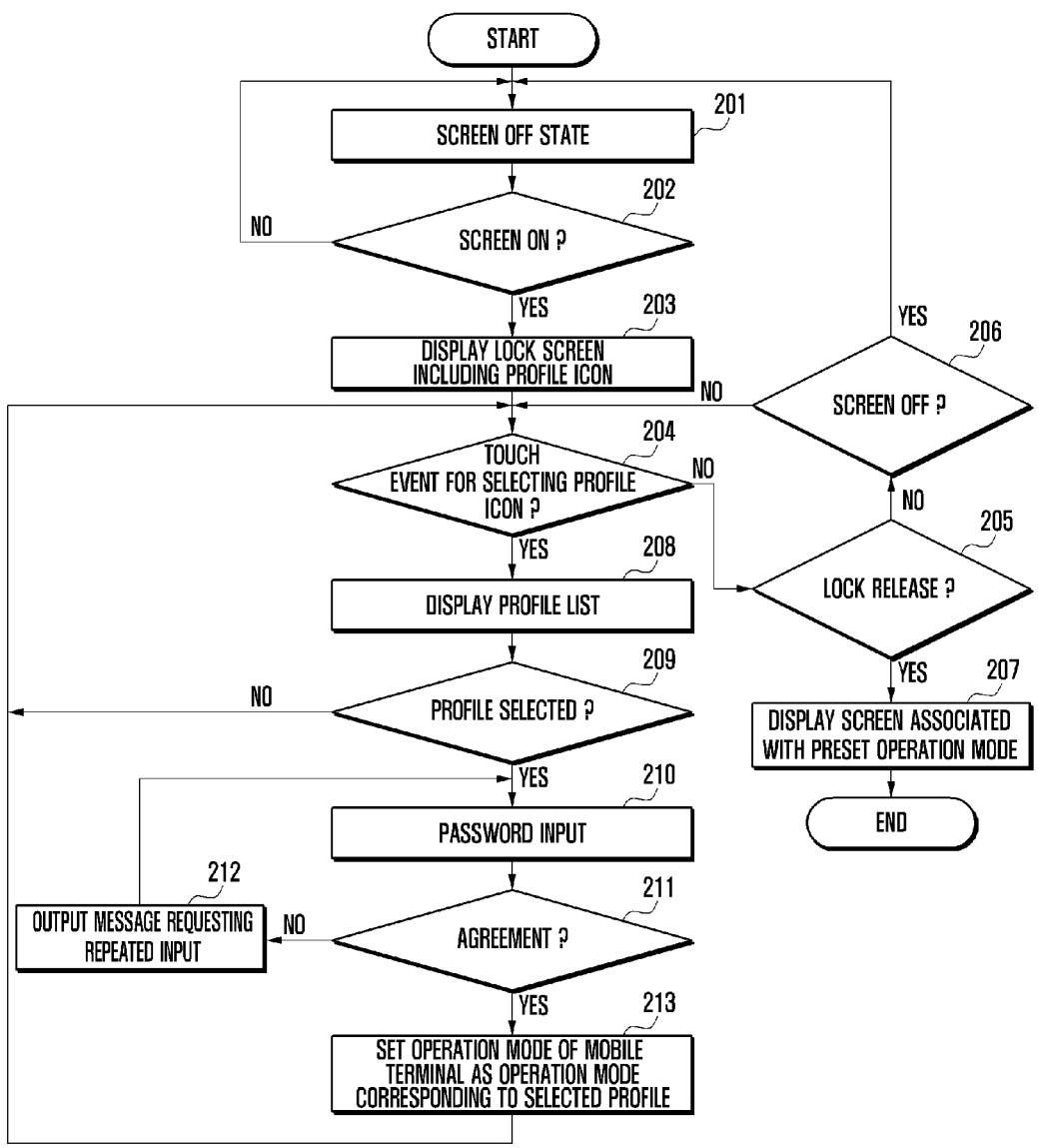
FIG. 2 is a flowchart illustrating a method for operating a mobile terminal, according to an embodiment of the present invention.
Figure 3:
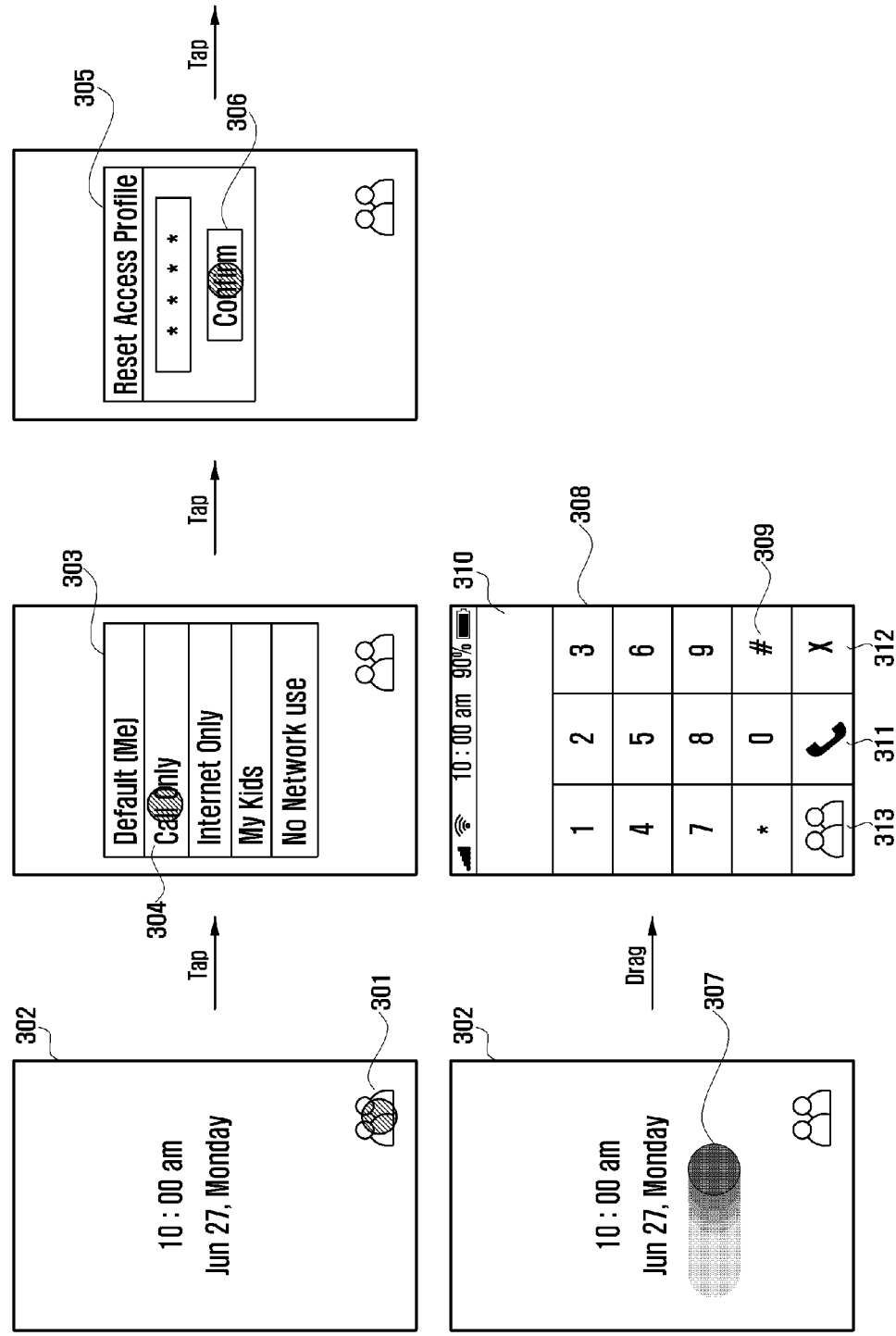
FIG. 3 illustrates a method for operating a mobile terminal, according to an embodiment of the present invention.

FIG. 2 is a flowchart illustrating a method for operating a mobile terminal according to an embodiment of the present invention. Referring to FIGS. 1 and 3, in step 201, a mobile terminal is in a screen off state. That is, in step 201, a controller 170 controls power supply to a display unit 130 to turn-off a screen of the display unit 130. In this state, the controller 170 determines whether a key signal for screen on is generated in step 202. When a screen on key signal is not generated at step 202, the controller 170 maintains a screen off state. Conversely, when the screen on key signal is generated, the controller 170 controls such that a locked screen including a profile icon is displayed in step 203. Here, the profile icon is an icon for displaying an operation mode-setting menu.

Next, in step 204, the controller 170 determines whether a touch event for selecting the profile icon is generated. When the touch event for selecting the profile icon is not generated at step 204, the controller 170 determines whether a touch event for releasing lock of a screen in step 205. When the touch event for lock release is not generated at step 205, the controller 170 proceeds to step 206. The controller 170 determines whether a key signal for screen off is generated in step 206. When a screen off key signal is not generated at step 206, the controller 170 returns to step 204. Conversely, when the screen off key signal is generated, the controller 170 controls power supply to the display unit 130 to turn-off the screen of the display unit 130 and the process returns to step 201. When no touch events are generated for a predetermined time at step 206, the controller 170 controls power supply to the display unit 130 to turn-off the screen of the display unit 130 and the process returns to step 201. When the touch event of lock release is generated at step 205, the controller 170 controls such that a screen associated with a preset operation mode is displayed in step 207.

When the touch event for selecting the icon at step 204, the controller 170 controls such that a profile list is displayed to overlap a locked screen in step 208. That is, the controller 170 controls such that a profile list including setting values by operation modes is displayed as illustrated in the Table 1. Next, the controller 170 determines whether a touch event for selecting a profile is generated in step 209. When the touch event for selecting the profile is not generated at step 209, the controller 170 returns to step 204. Specifically, if the user touches a part other than the profile list on a screen, the touchscreen 110 generates and transfers a touch event associated therewith to the controller 170. The controller 170 then controls such that a profile list disappears in step 209 and the process returns to step 204. Conversely, when the touch event for selecting a profile is generated, the controller 170 controls such that a keypad is displayed in step 210. The controller 170 controls such that windows for displaying a password input through a keypad are displayed. The controller 170 then controls such that a certain symbol instead of the input password is displayed on a window.

The controller 170 then determines whether the input password agrees with a stored password in step 211. When the input password is not equivalent to the stored password at step 211, the controller 170 controls the display unit 130 to output a message requesting repeated input in step 212, and again receives input of the password in step 210. When the input password agrees with the stored password at step 211, the controller 170 sets an operation mode of the mobile terminal as an operation mode corresponding to the selected profile in step 213, and the process returns to step 204.

The foregoing embodiment illustrates a method for operating a mobile terminal according to an embodiment of the present invention. Hereinafter, a method for operating a mobile terminal according to an embodiment of the present invention will be described in detail with reference to a screen example of FIG. 3.

FIG. 3 illustrates a method for operating a mobile terminal, according to an embodiment of the present invention. Referring to FIG. 3, if a side key is pushed in a screen off state by a user, a key input unit 120 generates and transfers a screen on signal associated therewith to the controller 170. The controller 170 then controls such that a locked screen 302 with a profile icon 301 is displayed. In this state, if the profile icon 301 is tapped by the user, the touchscreen 110 generates and transfers a touch event associated therewith to the controller 170. Then, the controller 170 controls such that a profile list 303 is displayed to overlap the locked screen. If one profile 304 is tapped among a plurality of profiles in a state that the profile list 303 is displayed, the touchscreen 110 generates and transfers a touch event for selecting a profile associated therewith to the controller 170. The controller 170 then controls such that the profile list 303 disappears, and controls such that a keypad (not shown) and a window 305 for displaying a password input through it are displayed.

If a confirm button 306 is tapped by the user in a state that a window 304 is displayed, the controller 170 determines whether the input password agrees with the stored password. If the input password is not equivalent to the stored password, the controller 170 controls such that a message requesting a repeated input in a state that display of the window 305 maintains. Conversely, if the input password is equivalent to the stored password, the controller 170 controls such that the window 305 disappears. That is, the controller 170 displays only a locked screen 302. If the user drags a predetermined part of a locked screen 302 for releasing screen lock (as shown in step 307) in this state, the controller 170 automatically performs an application corresponding to a set operation mode, for example, a call application, as shown in FIG. 3, and switches a screen from a locked screen 302 to a call screen 308. In this state, the user uses only a limited function of various functions of the mobile terminal. That is, the controller 170 controls such that a call screen 308 with a keypad 309, a window 310, a call button 311, and a release button 312 is displayed to use only a call function. The call screen 308 further includes a profile icon 313. Moreover, the controller 170 does not respond to any key signals and touch events other than input for resetting screen off, call and operation mode. As illustrated above, when there is a plurality of applications corresponding to a set operation mode, the controller 170 displays a screen including icons corresponding to respective applications of the set operation mode.

As illustrated above, in a method for operating a mobile terminal according to an embodiment of the present invention, while a locked screen is displayed, a user sets an operation mode of the mobile terminal and switch a locked screen to a screen of the set operation mode. A modified embodiment of a method for operating a mobile terminal will now be described in detail with reference to a screen example of FIGS. 4 and 5.

Figure 4:
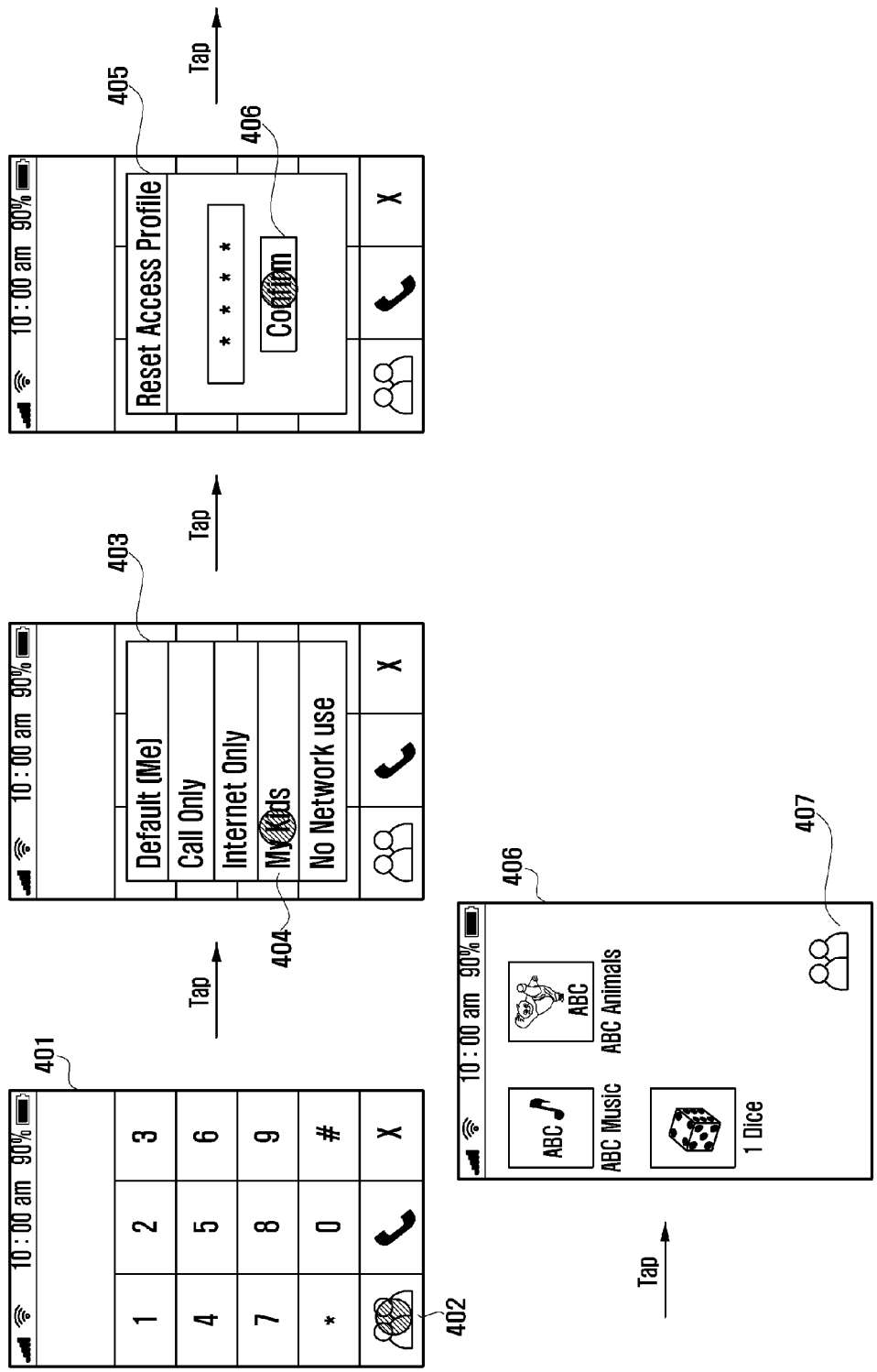
FIG. 4 illustrates a method for operating a mobile terminal, according to an embodiment of the present invention.

FIG. 4 illustrates a method for operating a mobile terminal according to another embodiment of the present invention. Referring to FIG. 4, the display unit 130 displays a call screen 401 according to a call mode of various limited modes. In this state, if a profile icon 402 is tapped, the controller 170 controls such that the profile list 430 is displayed overlapping the call screen 401. If one profile 404 is tapped from a plurality of profiles in a state that the profile list 403 is displayed, the touchscreen 110 generates and transfers a touch event for selecting a profile associated therewith to the controller 170. The controller 170 then controls such that the profile list 403 disappears, and a keypad (not shown) and a window 405 are displayed. If a confirm button 406 is tapped by a user in a state that the window 405 is displayed, the controller 170 determines whether an input password is the same as a stored password. If the input password is not the same as the stored password, the controller 170 controls such that a message requesting repeated input is output in a state that display of the window 405 maintains. However, if the input password is the same as the stored password, the controller 170 controls such that the window 405 disappears. Further, the controller 170 controls such that a screen 406 of a reset operation mode is displayed instead of the call screen 401. Screen 406 of the reset operation mode is a home screen including a plurality of application execution icons as shown in FIG. 4 not an execution screen of a certain application. If one is selected from a plurality of application execution icons by the user, the controller 170 controls such that a corresponding application is executed and an execution screen of the executed application is displayed. That is, the controller 170 executes only applications associated with icons displayed on the home screen 406. The home screen 406 includes a profile icon 407.

Figure 5:
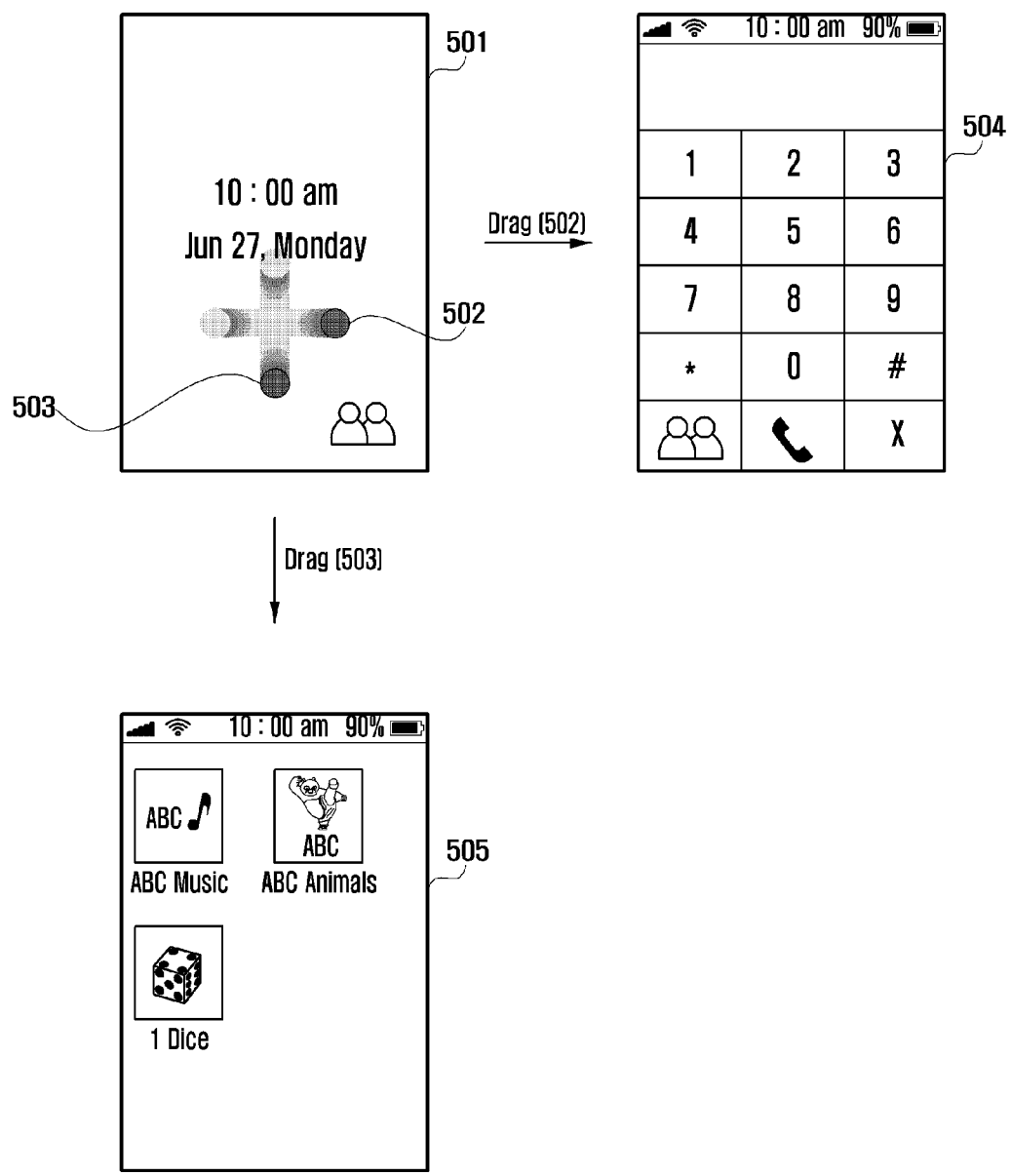
FIG. 5 illustrates a method for operating a mobile terminal, according to an embodiment of the present invention.

FIG. 5 illustrates a method for operating a mobile terminal according to an embodiment of the present invention. In a method for operating a mobile terminal according to another embodiment of the present invention, the controller 170 sets an operation mode according to a touch gesture of the user. Specifically, referring to FIG. 5, a display unit 130 displays a locked screen 501. If the user drags a predetermined part of a locked screen 501 for releasing screen lock and setting an operation mode in this state, the controller 170 release lock. Further, the controller 170 controls such that a screen of an operation mode corresponding to a direction of the drag is displayed. For example, as shown in FIG. 5, if the drag is a first drag 502 directing from the left to the right, the controller 170 sets an operation mode as a call mode and displays a call screen 504. In the meantime, if the drag is a second drag 503 directing from up to down, the controller 170 sets the operation mode as "My Kids" and displays a "My Kids" screen.

This embodiment of the present invention has illustrated that screen lock is released by the drag and an operation mode is set according to the direction of the drag. However, the present invention is not limited thereto. For example, if an operation of the user is "press," the controller 170 releases screen lock and set an operation mode as a call mode. Further, if the operation of the user is "sweep," the controller 170 releases the screen lock and set an operation mode as a "My Kids" mode, irrespective of a direction thereof. Moreover, in a further embodiment of the present invention, the user simply releases screen lock and set an operation mode by only a touch gesture. Because it is difficult for the user to memorize a touch gesture by set operation modes, a touch gesture may be allocated to only an operation mode to be frequently used of set operation modes. For example, a touch gesture may be allocated to only a "My Kids" mode including an open mode of operation modes illustrated in the table 1.

The foregoing method for operating a mobile phone of the present invention may be implemented in an executable program command form by various computer means and be recorded in a computer readable recording medium. The computer readable recording medium includes a program command, a data file, and a data structure individually or a combination thereof. The program command recorded in a recording medium may be designed or configured for the present invention or be known to a person having ordinary skill in a computer software field to be used.

The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. Random Access Memory (RAM), flash memory storing and executing program commands. Further, the program command includes a machine language code created by a complier and a high-level language code executable by a computer using an interpreter. The foregoing hardware device may be configured to be operated as one or more software modules to perform an operation of the present invention.

In the embodiments of the present invention, the present invention may easily limit a use right and improve use convenience. That is, the user may easily change an operation mode of a mobile terminal according to a use environment.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims and their equivalents.

What is claimed is:

1. A method for facilitating transition to one of a plurality of operation modes from a lock screen of a mobile terminal, the method comprising:
    configuring a first drag input on the lock screen of the mobile terminal to correspond to a normal mode for obtaining access to user applications on the mobile terminal;
    setting a restricted mode through a menu screen which allows a user of the mobile terminal to designate a subset of the user applications accessible in the restricted mode;
    based on the set restricted mode, configuring a second drag input on the lock screen to correspond to the restricted mode;
    providing a user interface (UI) comprising the lock screen through which a touch display of the mobile terminal is operable to receive the first drag input in a first direction and the second drag input in a second direction substantially perpendicular to the first direction;
    based on the touch display receiving the first drag input on the lock screen, unlocking the lock screen and displaying a first screen indicating the normal mode; and
    based on the touch display receiving the second drag input on the lock screen, unlocking the lock screen and displaying a second screen indicating the restricted mode,
    wherein the first drag input comprises a first scroll input, in the first direction, so as to scroll from the lock screen to the first screen, and
    wherein the second drag input comprises a second scroll input, in the second direction, so as to scroll from the lock screen to the second screen.

2. The method of claim 1, wherein the first screen includes at least an icon corresponding to a user application accessible in the normal mode.

3. The method of claim 1, wherein the first drag input is in a first single direction and the second drag input is in a second single direction perpendicular to the first single direction.

4. A mobile terminal having a plurality of operation modes accessible from a lock screen, the mobile terminal comprising:
    a controller comprising at least one hardware processor and configured to set a first drag input on the lock screen of the mobile terminal to correspond to a normal mode for obtaining access to user applications on the mobile terminal, to set a restricted mode through a menu screen which allows a user of the mobile terminal to designate a subset of the user applications accessible in the restricted mode, and to set a second drag input on the lock screen to correspond to the restricted mode based on the set restricted mode; and
    a touch display configured to provide a user interface (UI) comprising the lock screen through which the touch display is operable to receive the first drag input in a first direction and a second drag input in a second direction substantially perpendicular to the first direction,
    wherein the controller is configured to control the touch display to unlock the lock screen and to display a first screen indicating the normal mode based on the touch display receiving the first drag input,
    wherein the controller is configured to control the touch display to unlock the lock screen and to display a second screen indicating the restricted mode based on the touch display receiving the second drag input,
    wherein the first drag input comprises a first scroll input, in the first direction, so as to scroll from the lock screen to the first screen, and
    wherein the second drag input comprises a second scroll input, in the second direction, so as to scroll from the lock screen to the second.

5. The mobile terminal of claim 4, wherein the first screen includes at least an icon corresponding to a user application accessible in the normal mode.

6. The mobile terminal of claim 4, wherein the first drag input is in a first single direction and the second drag input is in a second single direction perpendicular to the first single direction.

7. A non-transitory computer-readable recording medium having embodied thereon a computer program for executing a method for facilitating transition to one of a plurality of operation modes from a lock screen of a mobile terminal, the method comprising:
    configuring a first drag input on the lock screen of the mobile terminal to correspond to a normal mode for obtaining access to user applications on the mobile terminal;
    setting a restricted mode through a menu screen which allows a user of the mobile terminal to designate a subset of the user applications accessible in the restricted mode;
    based on the set restricted mode, configuring a second drag input on the lock screen to correspond to the restricted mode;
    providing a user interface (UI) comprising the lock screen through which a touch display of the mobile terminal is operable to receive the first drag input in a first direction and the second drag input in a second direction substantially perpendicular to the first direction;

based on the touch display receiving the first drag input on the lock screen, unlocking the lock screen and displaying a first screen indicating the normal mode; and based on the touch display receiving the second drag input on the lock screen, unlocking the lock screen and displaying a second screen indicating the restricted mode, wherein the first drag input comprises a first scroll input, in the first direction, so as to scroll from the lock screen to the first screen, and wherein the second drag input comprises a second scroll input, in the second direction, so as to scroll from the lock screen to the second screen.

8. The non-transitory computer-readable recording medium of claim 7, wherein the first screen includes at least an icon corresponding to a user application accessible in the normal mode.

9. The non-transitory computer-readable recording medium of claim 7, wherein the first drag input is in a first single direction and the second drag input is in a second single direction perpendicular to the first single direction.

10. A method for facilitating transition to one of a plurality of operation modes from a lock screen of a mobile terminal, the method comprising:

configuring a first drag input on the lock screen of the mobile terminal to correspond to a normal mode for obtaining access to user applications on the mobile terminal;

setting a restricted mode through a menu screen which allows a user of the mobile terminal to designate a subset of the user applications accessible in the restricted mode;

based on the set restricted mode, configuring a second drag input on the lock screen to correspond to the restricted mode;

providing a user interface (UI) comprising the lock screen through which a touch display of the mobile terminal is operable to receive the first drag input in a first direction and the second drag input in a second direction perpendicular to the first direction;

based on the touch display receiving the first drag input on the lock screen, unlocking the lock screen and displaying a first screen indicating the normal mode; and based on the touch display receiving the second drag input on the lock screen, unlocking the lock screen and displaying a second screen indicating the restricted mode, wherein the first drag input comprises a first flick input, in the first direction, so as to flick the lock screen to display the first screen, and wherein the second drag input comprises a second flick input, in the second direction, so as to flick the lock screen to display the second screen.

11. The method of claim 10, wherein the first screen includes at least an icon corresponding to a user application accessible in the normal mode.

12. The method of claim 10, wherein the first drag input is in a first single direction and the second drag input is in a second single direction perpendicular to the first single direction.

13. A mobile terminal having a plurality of operation modes accessible from a lock screen, the mobile terminal comprising:

a controller comprising at least one hardware processor and configured to set a first drag input on the lock screen of the mobile terminal to correspond to a normal mode for obtaining access to user applications on the mobile terminal, to set a restricted mode through a menu screen which allows a user of the mobile terminal to designate a subset of the user applications accessible in the restricted mode, and to set a second drag input on the lock screen to correspond to the restricted mode based on the set restricted mode; and a touch display configured to provide a user interface (UI) comprising the lock screen through which the touch display is operable to receive the first drag input in a first direction and a second drag input in a second direction perpendicular to the first direction, wherein the controller is configured to control the touch display to unlock the lock screen and to display a first screen indicating the normal mode based on the touch display receiving the first drag input, wherein the controller is configured to control the touch display to unlock the lock screen and to display a second screen indicating the restricted mode based on the touch display receiving the second drag input, wherein the first drag input comprises a first flick input, in the first direction, so as to flick the lock screen to display the first screen, and wherein the second drag input comprises a second flick input, in the second direction, so as to flick the lock screen to display the second screen.

14. The mobile terminal of claim 13, wherein the first screen includes at least an icon corresponding to a user application accessible in the normal mode.

15. The mobile terminal of claim 13, wherein the first drag input is in a first single direction and the second drag input is in a second single direction perpendicular to the first single direction.

16. A non-transitory computer-readable recording medium having embodied thereon a computer program for executing a method for facilitating transition to one of a plurality of operation modes from a lock screen of a mobile terminal, the method comprising:

configuring a first drag input on the lock screen of the mobile terminal to correspond to a normal mode for obtaining access to user applications on the mobile terminal;

setting a restricted mode through a menu screen which allows a user of the mobile terminal to designate a subset of the user applications accessible in the restricted mode;

based on the set restricted mode, configuring a second drag input on the lock screen to correspond to the restricted mode;

providing a user interface (UI) comprising the lock screen through which a touch display of the mobile terminal is operable to receive the first drag input in a first direction and the second drag input in a second direction perpendicular to the first direction;

based on the touch display receiving the first drag input on the lock screen, unlocking the lock screen and displaying a first screen indicating the normal mode; and based on the touch display receiving the second drag input on the lock screen, unlocking the lock screen and displaying a second screen indicating the restricted mode, wherein the first drag input comprises a first flick input, in the first direction, so as to flick the lock screen to display the first screen, and wherein the second drag input comprises a second flick input, in the second direction, so as to flick the lock screen to display the second screen.

17. The non-transitory computer-readable recording medium of claim 16, wherein the first screen includes at least an icon corresponding to a user application accessible in the normal mode.

18. The non-transitory computer-readable recording medium of claim 16, wherein the first drag input is in a first single direction and the second drag input is in a second single direction perpendicular to the first single direction.

\* \* \* \* \*